(12) United States Patent
Lin et al.

(10) Patent No.: US 11,097,432 B2
(45) Date of Patent: Aug. 24, 2021

(54) ROBOTIC SYSTEM WITH RECONFIGURABLE END-EFFECTOR ASSEMBLY

(71) Applicant: GM Global Technology Operations LLC, Detroit, MI (US)

(72) Inventors: Yhu-Tin Lin, Rochester Hills, MI (US); Erik B. Golm, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 146 days.

(21) Appl. No.: 16/506,474

(22) Filed: Jul. 9, 2019

(65) Prior Publication Data
US 2021/0008735 A1 Jan. 14, 2021

(51) Int. Cl.
| | |
|---|---|
| B25J 18/00 | (2006.01) |
| B25J 9/00 | (2006.01) |
| B25J 17/00 | (2006.01) |
| B25J 15/00 | (2006.01) |
| B25J 9/10 | (2006.01) |

(52) U.S. Cl.
CPC ............ *B25J 18/00* (2013.01); *B25J 9/0009* (2013.01); *B25J 9/1005* (2013.01); *B25J 15/0019* (2013.01); *B25J 17/00* (2013.01)

(58) Field of Classification Search
CPC ........ B25J 18/00; B25J 9/0009; B25J 9/1005; B25J 17/00; B25J 15/0019; B25J 15/0061; F16B 7/0486
See application file for complete search history.

(56) References Cited

U.S. PATENT DOCUMENTS

| | | | | |
|---|---|---|---|---|
| 7,575,408 B2 * | 8/2009 | Tominaga | ............ | B25J 15/0052 414/222.04 |
| 9,656,394 B2 | 5/2017 | Lin et al. | | |
| 10,011,022 B1 | 7/2018 | Lin et al. | | |
| 10,011,023 B1 | 7/2018 | Lin et al. | | |
| 2010/0140969 A1 * | 6/2010 | Lin | ...................... | B25J 15/0061 294/86.4 |
| 2012/0279602 A1 * | 11/2012 | Lin | ...................... | H02G 11/00 138/109 |
| 2012/0280526 A1 * | 11/2012 | Lin | ...................... | B25J 15/0061 294/183 |
| 2012/0280527 A1 * | 11/2012 | Lin | ...................... | B25J 9/04 294/213 |
| 2016/0339590 A1 * | 11/2016 | Lin | ...................... | B25J 15/0061 |

\* cited by examiner

*Primary Examiner* — Stephen A Vu
(74) *Attorney, Agent, or Firm* — Vivacqua Crane

(57) ABSTRACT

An end-effector assembly includes a master boom, a frame rail coupled thereto, and at least one branch rail movably coupled to the frame rail by a swing branch lock. The swing arm is movably coupled to the at least one branch rail by a swing arm lock. Each of the swing branch lock and the swing arm lock further includes a clamp configured to movably secure the branch rail to the frame rail or the swing arm to the branch rail. A pivot shaft extends through the clamp and is configured to rotationally secure the clamp in place. A swing plate is secured to the pivot shaft and is configured for engagement with a configuration tool. A locking fastener extends through the swing plate and into the pivot shaft and is configured to lock and unlock the clamp in position.

11 Claims, 11 Drawing Sheets

ROBOTIC SYSTEM WITH RECONFIGURABLE END-EFFECTOR ASSEMBLY

FIELD

The present disclosure relates to a robotic system with a reconfigurable end-effector assembly.

INTRODUCTION

The statements in this section merely provide background information related to the present disclosure and may not constitute prior art.

Multi-axis industrial robots include articulated arms connected via joints. Each arm segment is driven via one or more joint motors. Typical industrial robots are controlled with respect to six different control axes. Collectively, the control axes enable rotation of the robot with respect to a fixed or mobile base, extension/retraction of a first arm, and raising/lowering of a second arm, as well as joint rotation and rotation/translation of a wrist disposed at a distal end of the second arm. Additional arms may be used in a serial arrangement depending on the design and an end-effector connected to the wrist may be manipulated to perform a desired work task.

The term "end-effector" refers to the particular end linkages or segments that, depending on the design of the robot, can securely grip, transport, orient, and release a workpiece. Certain end-effector assemblies are formed via a latticed array of elongated beams and/or rails to which are attached a set of tool branches suspended with end tools (e.g., suction cups or grippers of the type used for moving metal panels or panes of glass in a manufacturing facility). The individual tool branches and end tools traditionally are manually adjusted by an operator to a predetermined configuration prior to performing a specified work task.

SUMMARY

An end-effector assembly includes a master boom, a frame rail coupled thereto, and at least one branch rail movably coupled to the frame rail by a swing branch lock. The swing arm is movably coupled to the at least one branch rail by a swing arm lock. Each of the swing branch lock and the swing arm lock further includes a clamp, a pivot shaft, a swing plate and a locking fastener. The clamp is configured to movably secure the branch rail to the frame rail or the swing arm to the branch rail. The pivot shaft extends through the clamp and is configured to rotationally secure the clamp in place. The swing plate is secured to the pivot shaft and is configured for engagement with a configuration tool. The locking fastener extends through the swing plate and into the pivot shaft and is configured to lock and unlock the clamp in position.

In one embodiment, the swing arm lock further includes a clamp assembly configured to movably secure the swing arm to the branch rail. The clamp assembly comprises a roll clamp and a pitch-yaw clamp. The roll clamp is movably secured to the branch rail and comprises a body and a shaft. The body has a first end extending to a second end. The body further has an opening formed through the first and second ends to define an outer wall movably disposed about the branch rail. The shaft has a proximal end extending to a closed distal end wherein the proximal end is disposed on the outer wall and extends radially outwardly therefrom to the distal end. The body has a slot formed through the outer wall from the first and second ends and through the proximal end of the shaft defining first and second split portions of the shaft at the proximal end. The distal end is closed. The pitch-yaw clamp is movably secured about the shaft and configured to lock and unlock the roll clamp to the branch rail.

The swing arm lock further comprises a pivot shaft extending through the clamp assembly and configured to rotationally secure the clamp assembly in place. The swing arm lock further includes a swing plate secured to the pivot shaft and configured for engagement with a configuration tool. The swing arm lock further comprises a locking fastener extending through the swing plate and into the pivot shaft. The locking fastener is configured to lock and unlock the pitch-yaw clamp about the shaft, thereby locking and unlocking the roll clamp to the branch rail.

In this embodiment, the first end of the roll clamp comprises a first bearing bushing and a first bushing collet attached thereto. The first end has a collar retainer attached to the first bushing collet. The second end has a second bearing bushing and second bushing collet attached thereto. The second end has an endcap retainer attached to the second bushing collet.

In this example, the slot on the shaft is formed from the proximal end to a length along the shaft. In another example, the slot on the shaft is formed from the proximal end to a length adjacent the distal end.

In some embodiments, an end tool is arranged at a distal end of the swing arm. The end tool defines a first side of the end-effector assembly for engagement with a workpiece. The swing branch lock and the swing arm lock are configured to be engaged by the configuration tool on a second side of the end-effector assembly opposite to the first side. Additionally, the swing branch lock is movable relative to the frame rail between an unlocked and a locked state so as to fix the branch rail in position relative to the frame rail. The swing arm lock is movable along the branch rail between an unlocked and a locked state so as to fix the swing arm in position relative to the branch rail. Furthermore, the clamp of the swing arm lock is secured over a second swing arm clamp. The second swing arm clamp includes a pair of proximal split ends, such that unlocking the clamp of the swing arm allows the swing arm lock to be movable in at least a primary direction, a secondary direction, and a tertiary direction. The swing branch lock further comprises a rotatable joint secured to the pivot shaft at a side opposite the locking fastener. Additionally, the swing branch lock further comprises an extension leg for receiving a portion of a tubing, wherein the extension leg is elongated along a protrusion axis arranged perpendicularly to a pivot shaft axis.

An end-effector assembly having a master boom including a flexible dress assembly secured thereto. A frame rail is coupled to the master boom, such that the flexible dress assembly has a portion of hosing that extends along at least a portion of the frame rail. At least one branch rail is movably coupled to the frame rail by a swing branch lock. The swing branch lock has an extension leg for receiving a coiled portion of the flexible dress assembly. A swing arm is movably coupled to the at least one branch rail by a swing arm lock. The swing arm lock includes at least one fitting for receiving a proximal end of the flexible dress assembly secured thereto.

In one embodiment, the swing arm lock further includes a clamp assembly configured to movably secure the swing arm to the branch rail. The clamp assembly comprises a roll clamp and a pitch-yaw clamp. The roll clamp is movably secured to the branch rail and comprises a body and a shaft. The body has a first end extending to a second end. The body further has an opening formed through the first and second ends to define an outer wall movably disposed about the branch rail. The shaft has a proximal end extending to a closed distal end wherein the proximal end is disposed on the outer wall and extends radially outwardly therefrom to the distal end. The body has a slot formed through the outer wall from the first and second ends and through the proximal end of the shaft defining first and second split portions of the shaft at the proximal end. The distal end is closed. The pitch-yaw clamp is movably secured about the shaft and configured to lock and unlock the roll clamp to the branch rail.

The swing arm lock further comprises a pivot shaft extending through the clamp assembly and configured to rotationally secure the clamp assembly in place. The swing arm lock further includes a swing plate secured to the pivot shaft and configured for engagement with a configuration tool. The swing arm lock further comprises a locking fastener extending through the swing plate and into the pivot shaft. The locking fastener is configured to lock and unlock the pitch-yaw clamp about the shaft, thereby locking and unlocking the roll clamp to the branch rail.

In this embodiment, the first end of the roll clamp comprises a first bearing bushing and a first bushing collet attached thereto. The first end has a collar retainer attached to the first bushing collet. The second end has a second bearing bushing and second bushing collet attached thereto. The second end has an endcap retainer attached to the second bushing collet.

In this example, the slot on the shaft is formed from the proximal end to a length along the shaft. In another example, the slot on the shaft is formed from the proximal end to a length adjacent the distal end.

In some embodiments, the at least one fitting fluidly couples the flexible dress assembly to an end tool arranged on the swing arm. The at least one fitting is a pneumatic fitting in fluid communication with a fluid passage formed through the swing arm. Additionally, the coiled portion of the flexible dress assembly is arranged about a spring-loaded reel. Furthermore, the swing arm lock is movable along the branch rail between an unlocked state and a locked state so as to fix the swing arm in position relative to the branch rail. The swing branch lock is movable relative to the frame rail between an unlocked state and a locked state so as to fix the branch rail in position relative to the frame rail. Furthermore, an end tool is arranged at a distal end of the swing arm. The end tool defines a first side of the end-effector assembly for engagement with a workpiece. The swing branch lock and the swing arm lock are configured to be engaged by a configuration tool on a second side of the end-effector assembly opposite to the first side. Additionally, the swing branch lock further comprises a rotatable joint arranged opposing the extension leg.

An end-effector assembly includes a master boom having a flexible dress assembly secured thereto. A frame rail is coupled to the master boom, the flexible dress assembly has a portion extending along at least a portion of the frame rail. At least one branch rail is movably coupled to the frame rail by a swing branch lock. The swing branch lock has an extension leg for receiving a coiled portion of the flexible dress assembly. A swing arm is movably coupled to the at least one branch rail by a swing arm lock. The swing arm lock includes at least one fitting for receiving a proximal end of the flexible dress assembly secured thereto. Each of the swing branch lock and the swing arm lock further includes a clamp, a pivot shaft, a swing plate and a locking fastener. The clamp is configured to movably secure the branch rail to the frame rail or the swing arm to the branch rail. The pivot shaft extends through the clamp and is configured to rotationally secure the clamp in place. The swing plate is secured to the pivot shaft and is configured for engagement with a configuration tool. The locking fastener extends through the swing plate and into the pivot shaft and is configured to lock and unlock the clamp in position.

In one embodiment, the swing branch lock further includes a first clamp assembly, a first pivot shaft, a first swing plate, and a first locking fastener. The first clamp assembly is configured to movably secure the branch rail to the frame rail. The first pivot shaft extends through the first clamp assembly and is configured to rotationally secure the first clamp assembly in place. The first swing plate is secured to the first pivot shaft and configured for engagement with a configuration tool. The first locking fastener extends through the first swing plate and into the first pivot shaft. The locking fastener is configured to lock and unlock the first clamp assembly in position.

In this embodiment, the swing arm lock further includes a second clamp assembly configured to movably secure the swing arm to the branch rail. The second clamp assembly comprises a roll clamp and a pitch-yaw clamp. The roll clamp is movably secured to the branch rail and comprises a body and a shaft. The body has a first end extending to a second end. The body further has an opening formed through the first and second ends to define an outer wall movably disposed about the branch rail. The shaft has a proximal end extending to a closed distal end wherein the proximal end is disposed on the outer wall and extends radially outwardly therefrom to the distal end. The body has a slot formed through the outer wall from the first and second ends and through the proximal end of the shaft defining first and second split portions of the shaft at the proximal end. The distal end is closed. The pitch-yaw clamp is movably secured about the shaft and configured to lock and unlock the roll clamp to the branch rail.

In this example, the swing arm lock further comprises a second pivot shaft extending through the second clamp assembly and configured to rotationally secure the second clamp assembly in place. The swing arm lock further includes a second swing plate secured to the second pivot shaft and configured for engagement with a configuration tool. The swing arm lock further comprises a second locking fastener extending through the second swing plate and into the second pivot shaft. The second locking fastener is configured to lock and unlock the pitch-yaw clamp about the shaft, thereby locking and unlocking the roll clamp to the branch rail.

In this embodiment, the first end of the roll clamp comprises a first bearing bushing and a first bushing collet attached thereto. The first end has a collar retainer attached to the first bushing collet. The second end has a second bearing bushing and second bushing collet attached thereto. The second end has an endcap retainer attached to the second bushing collet.

In this example, the slot on the shaft is formed from the proximal end to a length along the shaft. In another example, the slot on the shaft is formed from the proximal end to a length adjacent the distal end.

In some embodiments, the swing arm lock is movable along the branch rail between an unlocked and a locked state so as to fix the swing arm in position relative to the branch rail. The swing branch lock is movable relative to the frame rail between an unlocked and a locked state so as to fix the branch rail in position relative to the frame rail. Additionally, an end tool is arranged at a distal end of the swing arm. The end tool defines a first side of the end-effector assembly for engagement with a workpiece. The swing branch lock and the swing arm lock are configured to be engaged by the configuration tool on a second side of the end-effector assembly opposite to the first side. Furthermore, the swing branch lock further comprises a rotatable joint secured to the pivot shaft at a side opposite the locking fastener.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
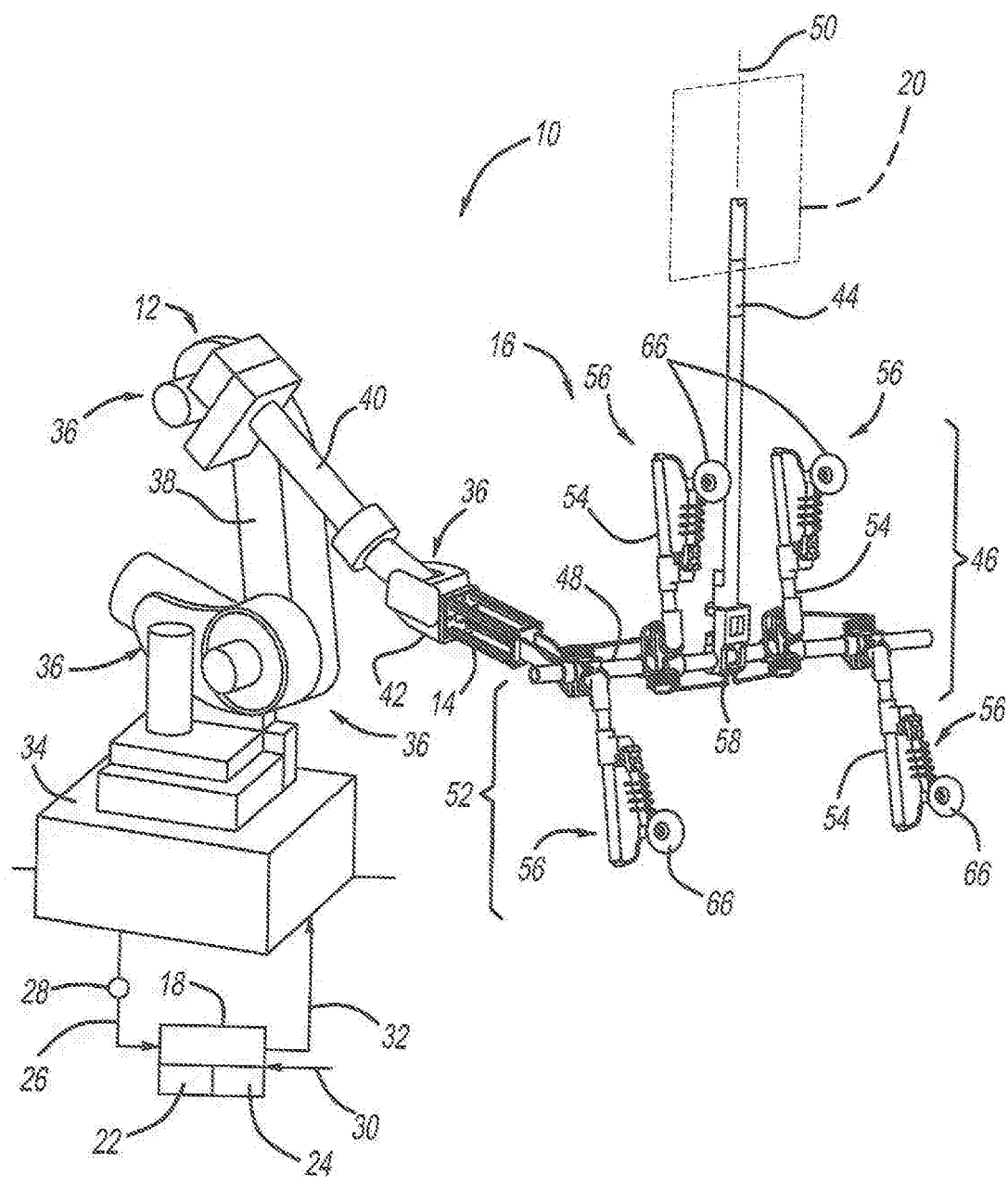
FIG. 1 is a perspective view of a robotic system including an end-effector assembly according to the present disclosure.

The following description is merely exemplary in nature and is not intended to limit the present disclosure, application, or uses. It should be understood that throughout the drawings, corresponding reference numerals indicate like or corresponding parts and features. Further, directions such as "top," "side," "back", "lower," and "upper" are used for purposes of explanation and are not intended to require specific orientations unless otherwise stated. These directions are merely provided as a frame of reference with respect to the examples provided, but could be altered in alternate applications.

Referring to the drawings, wherein like reference numbers refer to like components throughout the several figures, a robotic system 10 is shown schematically in FIG. 1. The robotic system 10 includes a multi-axis industrial robot 12, a configuration tool 14, and a reconfigurable end-effector assembly 16 described in detail below. Overall operational control of the robotic system 10 may be achieved via a controller 18. The robotic system 10 also includes a configuration stand 20, as will be discussed in greater detail below.

The controller 18 may be configured as a host machine (e.g., a digital computer), which is specially programmed to execute steps or instructions. To that end, the controller 18 includes sufficient hardware to perform the required method steps, i.e., with sufficient memory 22, a processor 24, and other associated hardware such as a high-speed clock, analog-to-digital and/or digital-to-analog circuitry, a timer, input/output circuitry and associated devices, signal conditioning and/or signal buffering circuitry. The memory 22 includes sufficient tangible, non-transitory memory such as magnetic or optical read-only memory, flash memory, etc., as well as random access memory, electrically erasable programmable read only memory, and the like. The controller 18 receives and records the measured joint positions (arrow 26) from at least one position sensor 28, and also monitors forces applied by or to the end-effector assembly 16 in the course of configuring the end-effector assembly 16, as well as, while operating on a given workpiece (not shown). The controller 18 generates or receives input signals (arrow 30) informing the controller 18 as to the required work task(s) to perform on the corresponding workpiece(s) and outputs control signals (arrow 32) to the robot 12 to command the required actions from the robot 12.

The robot 12 may be configured as a 6-axis industrial robot and may include a fixed or mobile base 34 and a plurality of robotic joints 36, at least some of which are shown in FIG. 1. The various joints 36 connect segments or serial linkages of the robot 12, including a first or lower robotic arm 38, a second or upper robotic arm 40, and a wrist 42, which collectively provide the desired range of motion and number of control degrees of freedom needed for performing assigned work tasks. It is contemplated that the robot 12 may include more or fewer robotic arms and wrists. Examples of such work tasks performed by the robot 12 include the grasping, lifting, locating, and placement of panels of metal or glass panes, along with a host of other possible tasks, such as painting and welding. Joint position sensors 28 may be positioned with respect to each joint 36 and configured to measure and report the measured joint positions (arrow 26) to the controller 18, as previously discussed. Additionally, one or more force sensors (not shown) may also be positioned with respect to the joints 36 and used to provide force or torque feedback to the controller 18, which may avoid excessive force on the workpiece or the end-effector assembly 16.

With respect to the end-effector assembly 16, this structure may include a master boom 44 and a latticed end-effector array 46. The end-effector array 46 in the depicted embodiments includes one frame rail 48 arranged orthogonally with respect to a longitudinal axis 50 of the master boom 44. It is contemplated, however, that the end-effector array 46 may include more than one frame rail 48. In the depicted embodiment, the frame rail 48 has a substantially cylindrical shape. The end-effector array 46 may also include a plurality of tool branches 52 movably coupled to the frame rail 48. However, the end-effector array 46 may alternatively have only a single tool branch 52. Each tool branch 52 includes a branch rail 54 and a tool module 56 cantilevered from the frame rail 48 and extending radially outward from the frame rail 48. The various branch rails 54 are slidingly and rotatingly attached to the frame rail 48. In other words, the branch rails 54 are movably coupled to the frame rail 48, as will be described in greater detail below. Individual tool modules 56 are suspended from or movably coupled to the branch rails 54. The frame rail 48 is connected, in turn, to the master boom 44 via a mechanical coupling 58.

Figure 2:
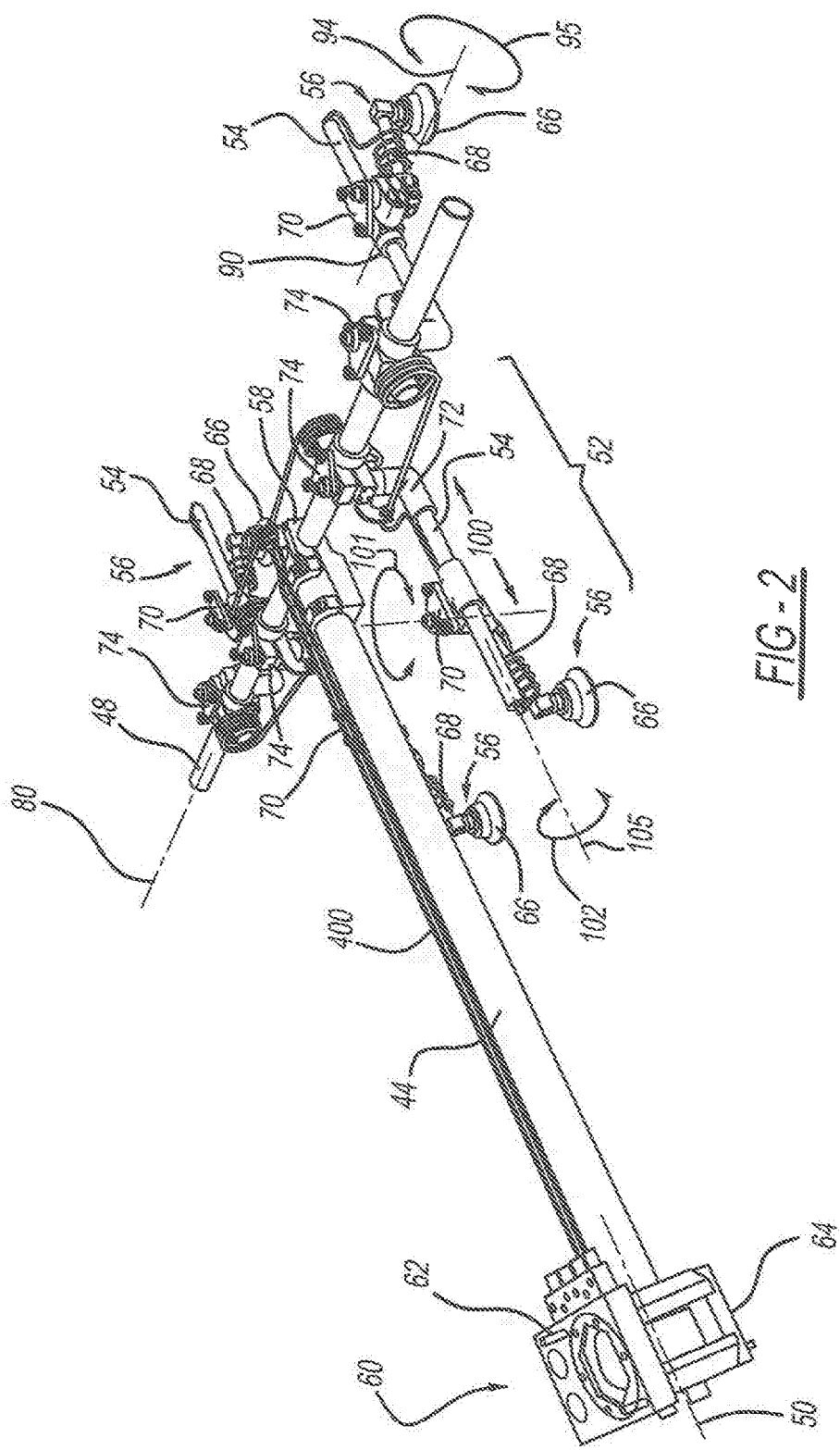
FIG. 2 is a perspective view of the end-effector assembly of FIG. 1 in a first orientation.

With reference now to FIG. 2, the master boom 44 may include a double-sided tool changer assembly 60 having opposing tool changers 62, 64. The term "tool changer" refers to manual or automatic assemblies that enable rapid change out of robotic end-effectors. Such devices typically include integrated power and communications ports, connectors, and the like as needed for functioning of an end tool, such as grippers or vacuum suction cups 66. In the depicted embodiment, the tool changer assembly 60 is specially configured to provide simultaneous engagement of the master boom 44 with both the robot 12 and the configuration stand 20, the latter of which is shown schematically in FIG. 1.

For the purposes of the present disclosure, the configuration stand 20 may be fixed with respect to a floor or suspended from a vertical surface such as a machine column or wall. The configuration stand 20 has a predetermined position in a Cartesian (e.g., XYZ) frame of reference, and thus provides a calibrated reference point for zeroing of the robot 12 during reconfiguration of the end-effector assembly 16. For example, when transitioning from a first configuration to another configuration, the robot 12 connects the tool changer 64 to the configuration stand 20 and releases the tool changer 62. As the robot 12 reconfigures the end-effector assembly 16, the locations in free space of each of the locking mechanisms (e.g., swing branch lock mechanism 74 and swing arm lock mechanism 70) described below is known to the controller 18 by virtue of the known location in the frame of reference provided by the configuration stand 20. In the event the configuration of the end-effector assembly 16 becomes unknown during an operation (e.g., due to an impact event or power failure), the end-effector assembly 16, while suspended from the configuration stand 20, can be manually set to a calibrated setting in which the positions of the various end tools and locking mechanisms are known, with configuration thereafter commencing from the zeroed setting.

The branch rails 54 with attached tool modules 56 are automatically repositionable by the robot 12 using the configuration tool 14 and instructions executed by the controller 18. Accordingly, the tool branches 52 may be arranged as desired to permit the tool modules 56, or more precisely, the individual end tools 66 of the tool modules 56, to attach to or otherwise interact with a given workpiece. In a non-limiting body panel example, the corresponding end tools 66 as shown in the various figures are configured as pneumatic suction cups or grippers of the type commonly used to secure and move automotive or other body panels without marring cosmetic show surfaces. However, other end tools 66, such as pinchers, clamps, or spray nozzles may be used. Therefore, the particular construction of the end tools 66 may vary. In each tool branch 52, a swing arm 68 is coupled between the end tool 66 and the branch rail 54 by a swing arm lock mechanism 70 and the branch rail 54 is coupled to the frame rail 48 by a swing branch lock mechanism 74, as will be described in greater detail below.

The end-effector assembly 16 can be reconfigured to interact with workpieces having different sizes, shapes, and/or surface contours relative to each other and other workpieces, and constructed from different materials. For example, a workpiece may be considerably larger and more uniform than another workpiece, thereby requiring different configurations of the same end-effector assembly 16. Any number of possible workpieces may be encountered in a given manufacturing operation, and thus the end-effector assembly 16 is reconfigurable by the robot 12 to operate on any of them individually, as needed.

The controller 18 is made aware of the particular workpiece to be operated on via the input signals (arrow 30 of FIG. 1), such as via manual selection by an operator, detection of an RFID tag, or any other suitable identifying process. The controller 18 then automatically selects a corresponding configuration from its memory 22. After the end-effector assembly 16 has been deposited on the configuration stand 20 via the tool changer 64, the robot 12 then releases the end-effector assembly 16 via the tool changer 62 and moves to attach the configuration tool 14 at a suitable workstation (not shown) to its wrist 42 or other suitable end linkage via another tool changer 142 mounted on the configuration tool 14 (see FIG. 7) so as to configure the end-effector assembly 16. Such a workstation may be embodied as a fixture that allows the configuration tool 14 to be retained at a calibrated position, i.e., a position readily accessible by the wrist 42. All of this occurs while the end-effector assembly 16 remains captive on the configuration stand 20. Furthermore, the present embodiment allows for the end-effector assembly 16 to be configured by the robot 12 without the need for any "flipping" on the configuration stand 20, as the lock/unlock features of the swing arm lock 70 and the swing branch lock 74 are accessible from the opposite direction of the end tools 66.

Once the end-effector assembly 16 has been fully configured for the task at hand using the configuration tool 14, the robot 12 automatically deposits the configuration tool 14 to its workstation, detaches the configuration tool 14 from the wrist 42 via releasing the tool changer 142 on the configuration tool 14, moves to pick up the newly configured end-effector assembly 16 by engaging the tool changer 62 and releasing the tool changer 64 at the same time, removes the end-effector assembly 16 from the configuration stand 20, and commences operation on a workpiece. The ability of the robot 12 to reconfigure the end-effector assembly 16, without flipping the end-effector assembly 16, allows for its use across a wide range of possible workpieces and in a variety of different environments, without concern for space limitation. In this way, manufacturing flexibility and efficiency can be enhanced, while reducing tooling costs and system downtime.

With continuing reference to FIG. 2, the end-effector assembly 16 includes at least one frame rail 48 arranged orthogonally with respect to the boom axis 50 of the main boom 44, with the various tool modules 56 connected with respect to the radially-extending branch rails 54. In an example embodiment in which the end tools 66 are pneumatic grippers, a flexible pneumatic hosing or dress assembly 400 may be routed along the main boom 44 and directed to the various end tools 66, as will be described in greater detail below.

Figure 3:
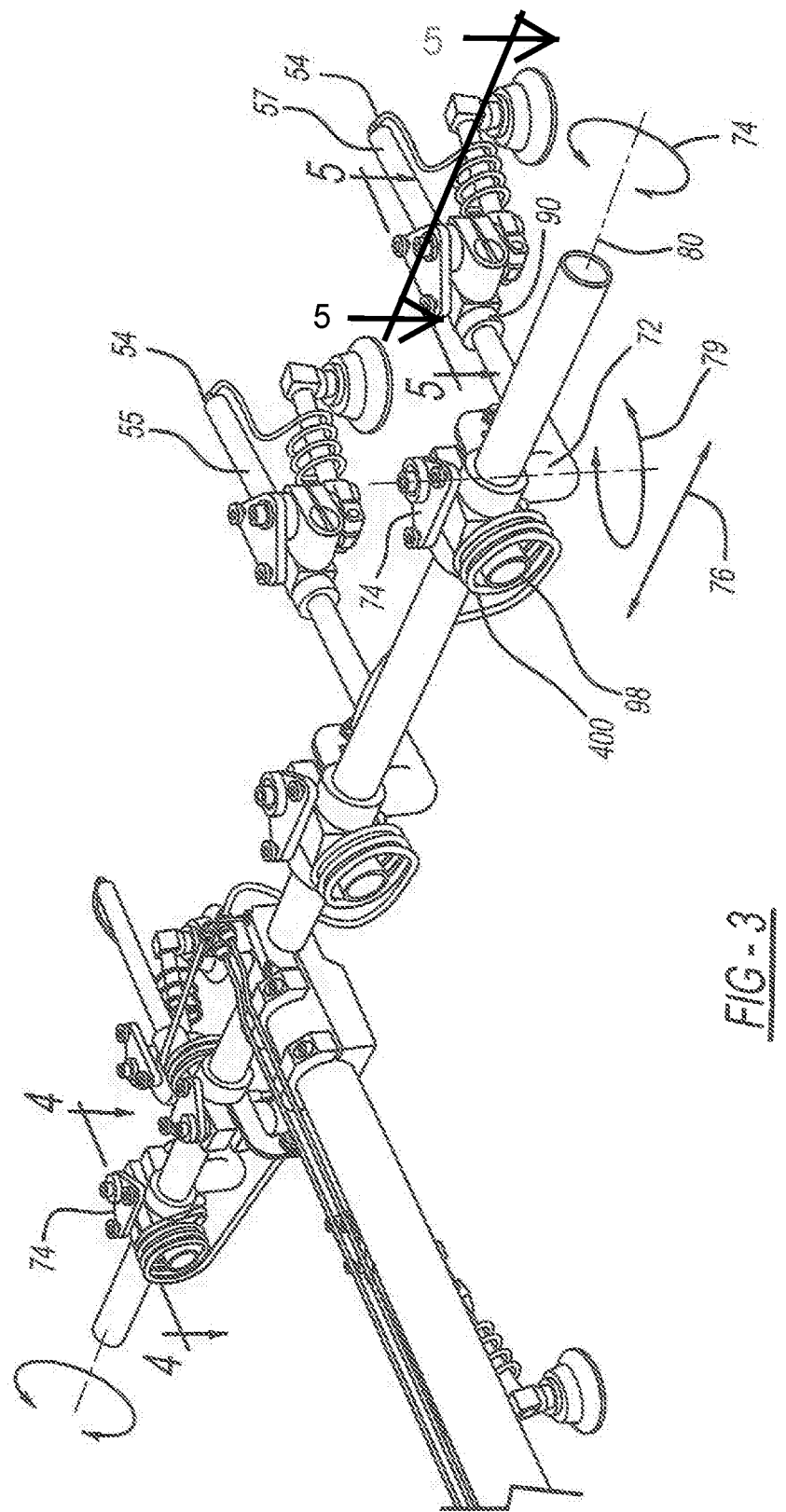
FIG. 3 is a perspective view of the end-effector assembly of FIG. 1 in a second orientation.
Figure 4:
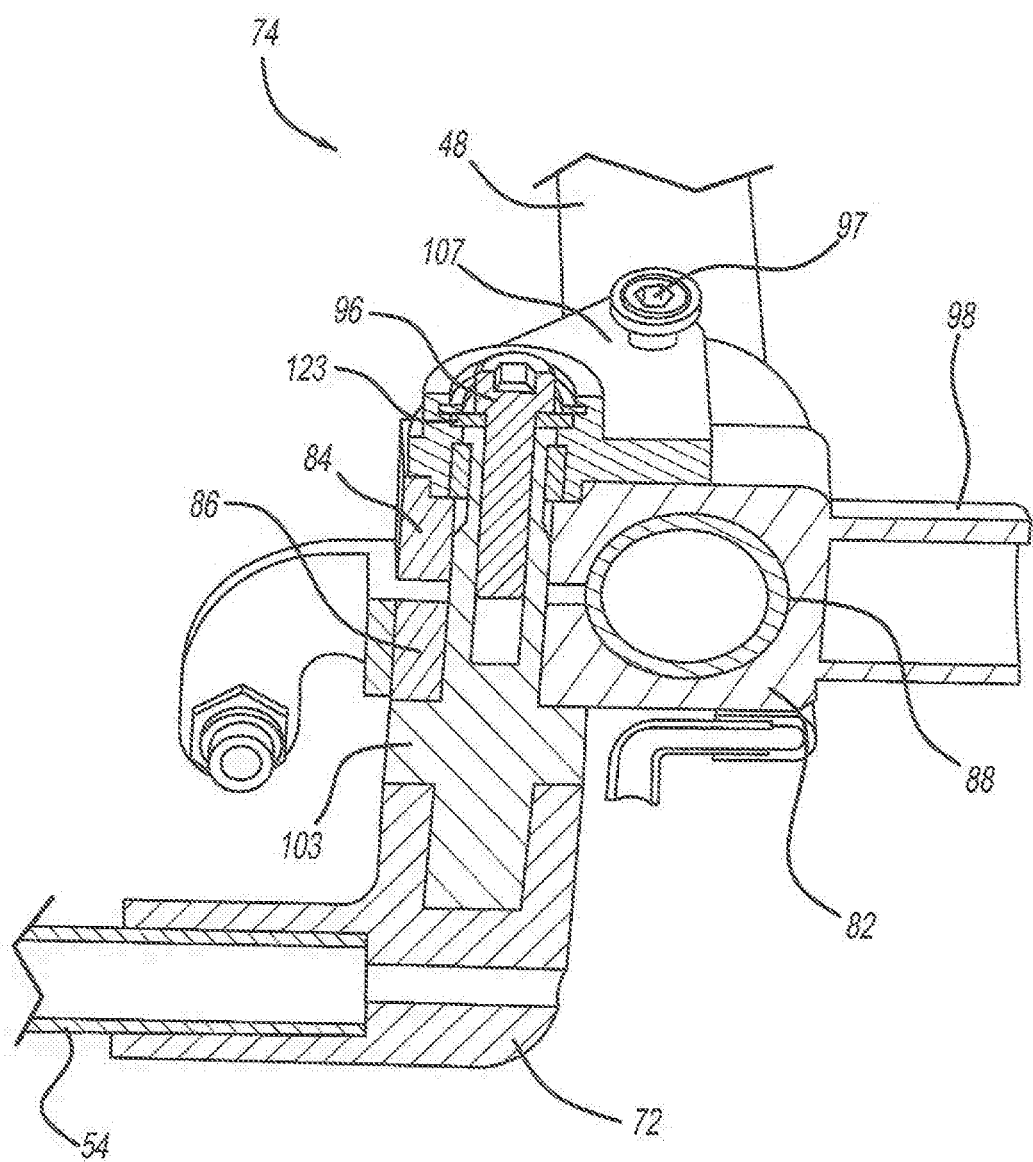
FIG. 4 is a cross-sectional view of a swing branch lock of the end-effector assembly, taken along section line 4-4 of FIG. 3.

With reference to FIG. 2 through FIG. 4, each tool branch 52 includes a swing branch lock 74 having a rotatable coupling 72 for securing the branch rail 54 to the frame rail 48. In the depicted embodiment, the swing branch lock 74 can move between a locked and an unlocked state. In the locked state, the swing branch lock 74 fixes the position of the branch rail 54 relative to the frame rail 48 and, therefore, the branch rail 54 remains stationary relative to the frame rail 48. When the swing branch lock 74 is in the unlocked state, the branch rail 54 can translate along the frame rail 48 in the directions indicated by arrow 76, can rotate around the frame rail 48 in the directions indicated by arrow 78, and can rotate about a pivot shaft 103 at the joint 72 (see FIG. 4) in the directions indicated by arrow 79. In this manner, any number of different configurations of the tool modules 56 may be set by the robot 12 as needed in response to the commands (arrow 32) from the controller 18. As discussed in detail below, the configuration tool 14 can be used to move the swing branch lock 74 between the locked and unlocked states. Due to its rounded cross-section (e.g., circular cross-section), the frame rail 48 allows the swing branch lock 74 to rotate about the frame rail axis 80 when the swing branch lock 74 is in the unlocked state. Also due to the joint 72, the swing branch lock 74 can swing about the frame rail 48 when the swing branch lock 74 is in the unlocked state. In addition, the swing branch lock 74 can slide along the frame rail axis 80 when it is disposed in the unlocked state. As an example only, an alternate configuration is depicted in FIG. 3 having one of the branch rails 54 (e.g., first branch rail 55) rotated so as to be co-located alongside another branch rail 54 (e.g., second branch rail 57) due to the rotation of the swing branch lock 74 around the axis of the pivot shaft 103 at the joint 72.

In the depicted embodiment shown in FIG. 4, the swing branch lock 74 includes a clamp 82 for clamping the frame rail 48, the pivot shaft 103 for rotationally securing the branch rail 54 to the clamp 82, a swing plate 107 for engagement with the configuration tool 14, and a captured fastener 96 for tightening and releasing the swing branch lock 74. In particular, the clamp 82 is configured as a wrap-around clamp having a clamp arm 84 adjoined with a clamp base 86. The clamp 82 can be clamped and/or loosened on the frame rail 48 by pinching and/or releasing the clamp arm 84 and the clamp base 86. The clamp 82 defines a clamp recess 88 configured, shaped, and sized to receive a portion of the frame rail 48. The clamp recess 88 may have a concave shape in order to allow the frame 48 to seat on the clamp arm and base 84, 86.

A captured fastener 96 can be used to adjust the distance between the clamp arm 84 and the clamp base 86. As non-limiting examples, the fastener 96 may be a screw, a bolt, or any other suitable fastener for moving the clamp arm and base 84, 86 toward and away from each other. In the depicted embodiment, for example, the captured fastener 96 is secured within the swing plate 107 via a retaining ring 123. In this way, when unclamping, the captured fastener 96 freely spins, but the pivot shaft 103 may be pushed away axially to unlock the clamp 82 instead of causing the captured fastener 96 to push back the configuration tool 14.

As should be understood, rotating the fastener 96 causes the clamp arm 84 to move towards or away from the clamp base 86, thereby tightening or loosening the clamp 82 with respect to the frame rail 48. Specifically, rotating the fastener 96 in a first rotational direction (e.g., clockwise) locks the clamp 82, and rotating the fastener 96 in an opposite direction (e.g., counterclockwise) unlocks the clamp 82. When the clamp 82 is locked, the branch rail 54 is fixed with respect to the frame rail 48, and therefore, remains stationary relative to the frame rail 48. When the clamp 82 is unlocked, the branch rail 54 can translate, rotate, and swing relative to the frame rail 48. The clamp 82 may also be configured as a two-part clamp with one hinge, a double-hinged three-part clamp, or any other suitable clamp design.

The swing branch lock 74 may further define a plurality of lugs or tabs 97 providing a feature for the configuration tool 14 to engage and adjust the swing branch lock 74, as will be described in greater detail below. At least one of the tabs 97 may incorporate a centering feature for use in alignment control by the robot 12. The swing branch lock 74 additionally includes an extension leg 98 for holding at least a portion of the flexible pneumatic dress assembly 400 (see, e.g., FIG. 3).

Figure 5A:
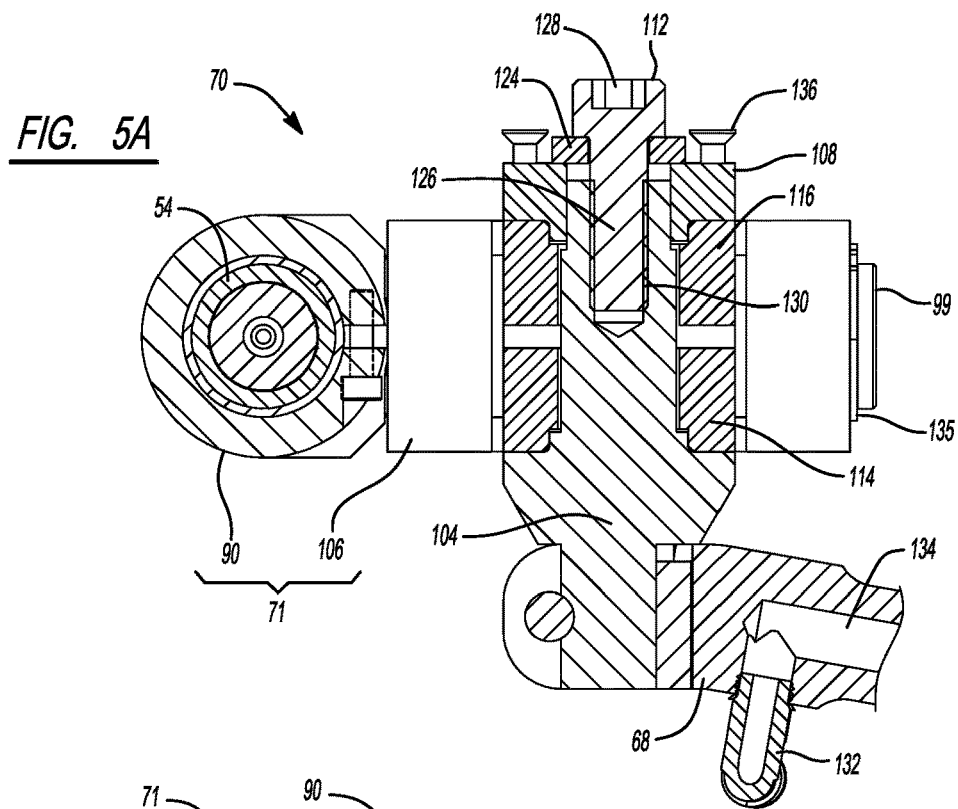
FIG. 5A is a cross-sectional view of a swing arm lock of the end-effector assembly, taken along section line 5-5 of FIG. 3.
Figure 5B:
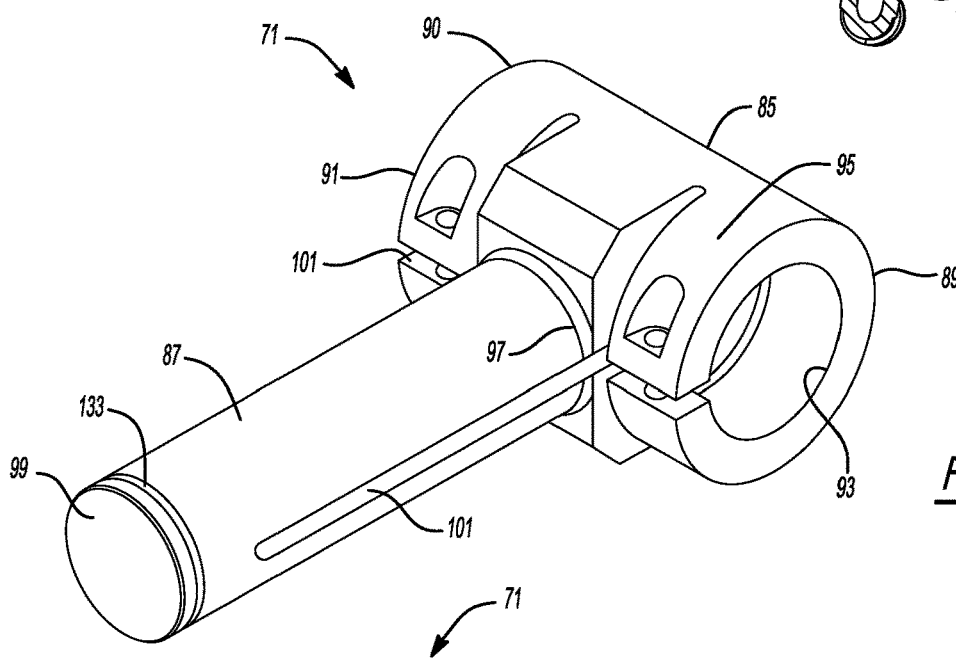
FIG. 5B is a perspective view of a roll clamp of the swing arm lock of the end-effector assembly.
Figure 5C:
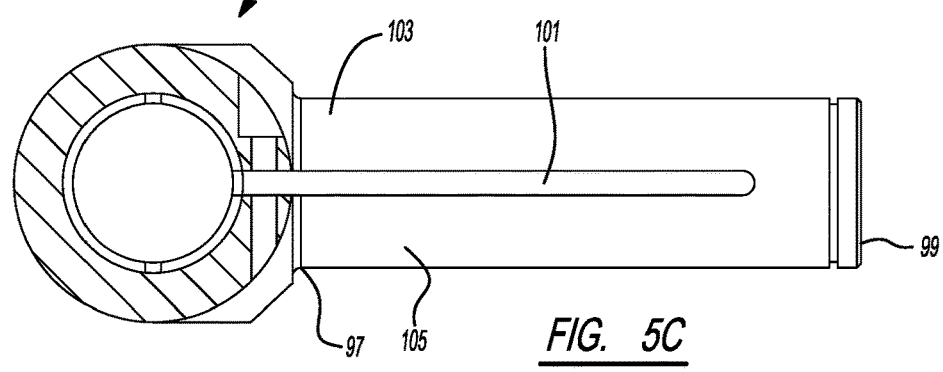
FIG. 5C is a cross-sectional view of the roll clamp of FIG. 5B taken along lines 5C-5C.
Figure 6:
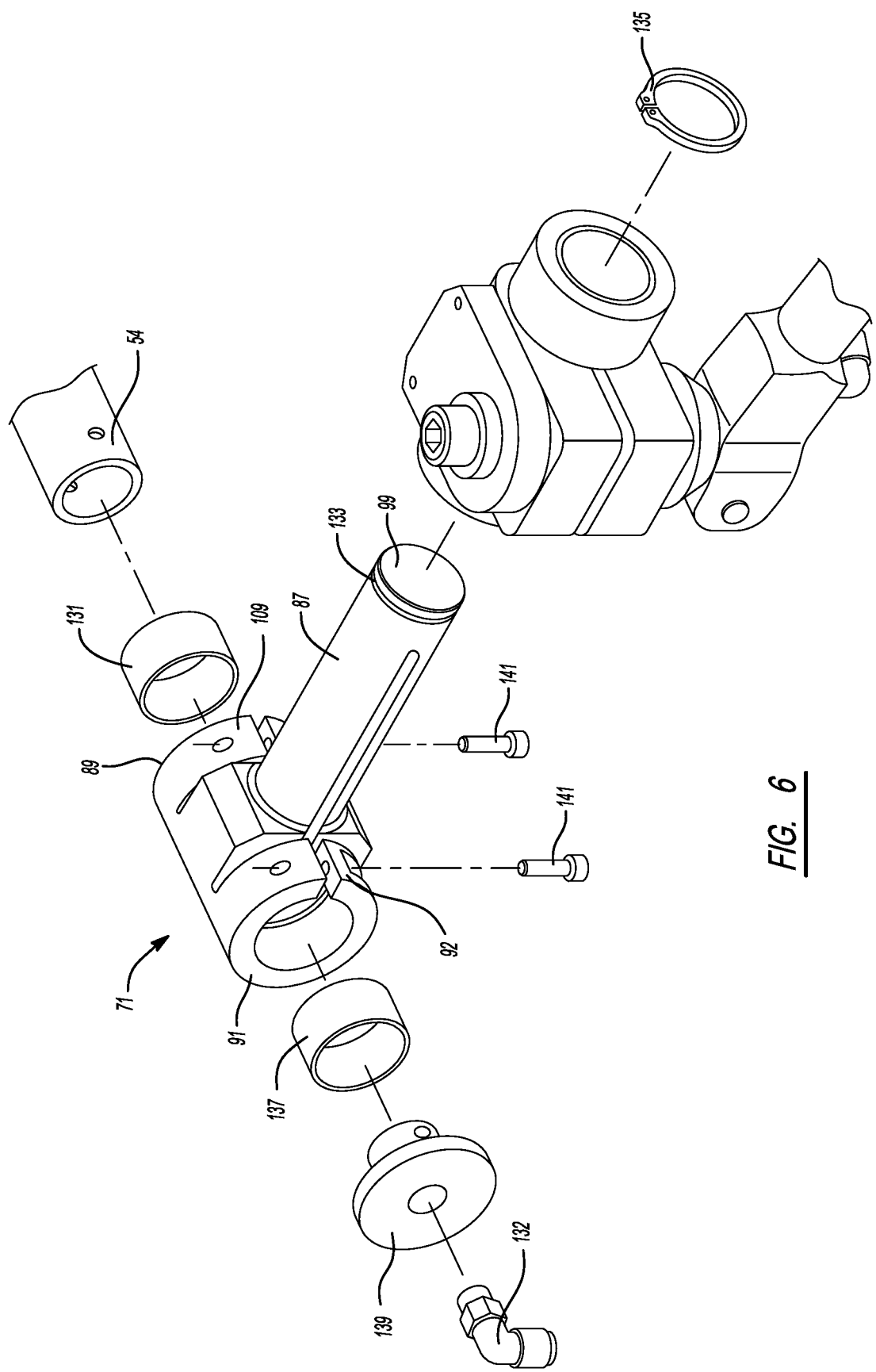
FIG. 6 is a cross-sectional view of an alternative swing arm lock of the end-effector assembly.

With continued reference to FIG. 2 and reference now to FIG. 5, the swing arm 68 is obliquely angled relative to the branch rail 54 in order to help the end tool 66 interact with a workpiece. In the depicted embodiment, the swing arm lock 70 can move between the locked and unlocked states. In the locked state, the swing arm lock 70 fixes the position of the swing arm 68 relative to the branch rail 54 and, therefore, the swing arm 68 remains stationary relative to the branch rail 54. When the swing arm lock 70 is in the unlocked state, the swing arm 68 can translate along the branch rail 54 in the directions indicated by arrow 100, can rotate about the branch rail 54 in the directions indicated by arrow 102, can rotate about a pivot shaft 104 (see FIG. 5) in the directions indicated by arrow 101, and can rotate about a tertiary axis 94 in the directions indicated by arrow 95. In this manner, any number of different configurations of the tool modules 56 may be set by the robot 12 as needed in response to the commands (arrow 32) from the controller 18. Due to its rounded cross-section (e.g., circular cross-section), the branch rail 54 allows the swing arm lock 70 to rotate about the branch rail axis 105 when the swing arm lock 70 is in the unlocked state. In addition, the swing arm lock 70 can slide along the branch rail axis 105 when it is disposed in the unlocked state. As discussed in detail below, the configuration tool 14 can be used to move the swing arm lock 70 between the locked and unlocked states.

Referring now to FIGS. 5a-5b, the swing arm lock 70 includes a clamp assembly 71 having a first wrap-around clamp (or roll clamp) 90 and a second wrap-around clamp (or pitch-yaw clamp) 106 for clamping the swing arm 68 to the branch rail 54. The swing arm lock 70 further includes a pivot shaft 104 for rotationally securing the swing arm 68 to the wrap-around clamp 106, a swing plate 108 for engagement with the configuration tool 14, and a locking fastener 112 for tightening and releasing the swing arm lock 70.

In this embodiment, the clamp assembly 71 is configured to movably secure the swing arm 68 to the branch rail 54. As discussed above, the clamp assembly 71 comprises a roll clamp 90 and a pitch-yaw clamp 106. The roll clamp 90 is slidably and rotatably movably secured to the branch rail 54. The branch rail 54 comprises a body 85 and a roll shaft 87. The body 85 has a first end 89 extending to a second end 91. The body 85 further has an opening 93 formed through the first and second ends 89, 91 to define an outer wall 95 movably disposed about the branch rail 54. The roll shaft 87 has a proximal end 97 extending to a closed distal end 99 wherein the proximal end 97 is disposed on the outer wall 95 and extends radially outwardly therefrom to the distal end 99. When in the unlocked state, the roll clamp 90 may be slidably movable longitudinally along the branch rail 54 axis and rotatably movable about the branch rail 54 axis.

Preferably, the body 85 has a slot 101 formed through the outer wall 95 from the first and second ends, 89 and 91 respectively. As shown, the slot 101 is further formed through the proximal end 97 of the roll shaft 87 defining first and second split portions 103, 105 of the roll shaft 87 at the proximal end 97. The distal end 99 is closed. The pitch-yaw clamp 106 is movably secured about the roll shaft 87 between the proximal end 97 and the distal end 99 via the retaining ring 135 locked in the ring groove 133 on the roll shaft 87, and configured to lock and unlock the roll clamp 90 to the branch rail 54. As shown, in this example, the slot 101 on the roll shaft 87 is formed from the proximal end 97 to a length along the roll shaft.

As will be discussed in greater detail below, the swing arm lock 70 further comprises a pivot shaft 104 extending through the clamp assembly 71 and configured to rotationally secure the clamp assembly in place. The swing arm lock 70 further includes a swing plate 108 secured to the pivot shaft 104 and configured for engagement with a configuration tool. The swing arm lock 70 further comprises a locking fastener 112 extending through the swing plate 108 and into the pivot shaft 104. The locking fastener 112 is configured to lock and unlock the pitch-yaw clamp 106 about the roll shaft 87, thereby locking and unlocking the roll clamp 90 to the branch rail 54.

In this embodiment, the first end 89 of the roll clamp 90 comprises a first bearing bushing 131 mounted inside a first bushing collet 109. the first bushing collet 109 can be locked by fasteners 141. The second end 91 has a second bearing bushing 137 mounted inside a second bushing collet 92. the second bushing collet 92 can be locked by fasteners 141. On the side of the second end 91, an endcap 139 is attached to the distal end of the branch rail 54 serving as a hard stop of sliding movement of the roll clamp 90 on the branch rail 54 in addition to being a connection of pneumatic fittings 132.

In this embodiment, the pitch-yaw or wrap-around clamp 106 can be clamped and/or loosened by pinching and/or releasing a pair of split flanges (i.e., split flange base 114, split flange arm 116) over the roll shaft 87 of the roll clamp or wrap-around clamp 90, which is, in turn, secured over the branch rail 54. It is to be understood that the slot on the roll clamp defines the proximal end having a pair half-rounded, proximal split ends 103, 105 of the roll shaft 87 which, in turn, allows the roll clamp to be pinched thereby securing the swing arm lock over the branch rail 54. As shown, the slot 101 extends from the proximal end 97 to a length along the roll shaft 87 and terminates away or adjacent from the distal end 99. Thus, the distal end 99 of the roll shaft 87 is closed, providing enhanced securement to the branch rail 54 and robustness to the clamp assembly 71.

As previously discussed, the swing arm 68 may carry the end tools 66. The swing arm 68 may be tightened to the wrap-around clamp 106 when in the locked state, but is free to rotate with the fastened pivot shaft 104 when in the unlocked state. To this end, the pivot shaft 104 may extend through openings in the split flange base 114 and split flange arm 116 and terminate at the swing plate 108. The locking fastener 112 can movably couple the split flange base 114 to the split flange arm 116. As non-limiting examples, the locking fastener 112 may be a screw, a bolt, or any other suitable fastener including external threads. In the depicted embodiment, for example, the locking fastener 112 is a captured fastener secured within the swing plate 108 via a retaining ring 124. In this way, when unclamping, the locking fastener 112 freely spins, but the pivot shaft 104 may be pushed away axially to loosen the swing arm lock 70 instead of causing the captured fastener 112 to push back the configuration tool 14.

The locking fastener 112 further includes a lock shaft 126 and a head 128 coupled to the lock shaft 126. The head 128 is arranged to protrude from the swing plate 108, while the lock shaft 126 is partially disposed in a blind hole 130 extending through the pivot shaft 104. The blind hole 130 of the pivot shaft 104 is internally threaded and is configured, shaped, and sized to mate with an external thread of the lock shaft 126. As a result, rotating the locking fastener 112 causes the split flange base 114 and the split flange arm 116 to move together or apart, thereby tightening or loosening the wrap-around clamps 90, 106 with respect to the branch rail 54 and the swing arm 68, concurrently. Specifically, rotating the locking fastener 112 in a first rotational direction (e.g., clockwise) threads the locking fastener 112 into the pivot shaft 104 and locks the wrap-around clamp 106, while rotating the locking fastener 112 in an opposite direction (e.g., counterclockwise) unthreads the locking fastener 112 from the pivot shaft 104 and unlocks the wrap-around clamp 106.

In addition, at least one pneumatic fitting 132 may be coupled to the swing arm 68 in order to fluidly couple the flexible pneumatic dress assembly 400 to the end tools 66 arranged on the swing arm 68. The pneumatic fitting 132 may be in fluid communication with a fluid passage 134 formed through the swing arm 68. The swing plate 108 may further define a plurality of lugs or tabs 136 providing a feature for the configuration tool 14 to engage and adjust the wrap-around clamp 106, as will be described in greater detail below. At least one of the tabs 136 may incorporate a centering feature for use in alignment control by the robot 12.

Figure 7:
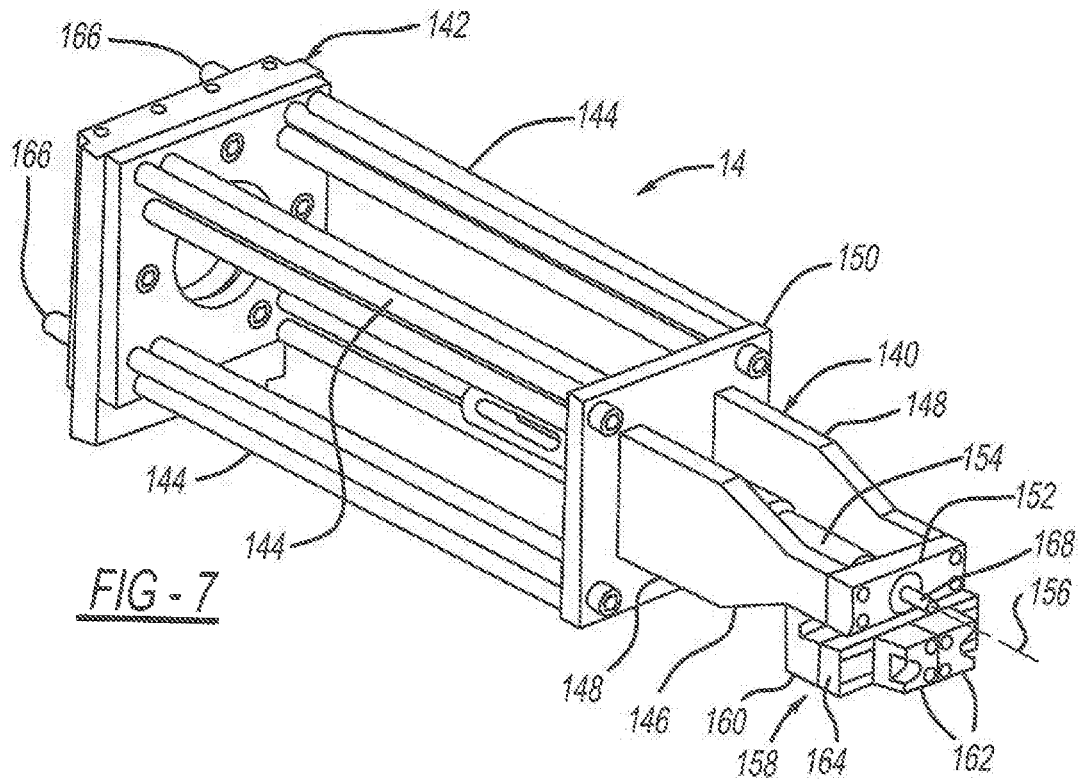
FIG. 7 is a perspective view of a configuration tool usable as part of the robotic system of FIG. 1, with a gripper depicted in a disengaged state.
Figure 8:
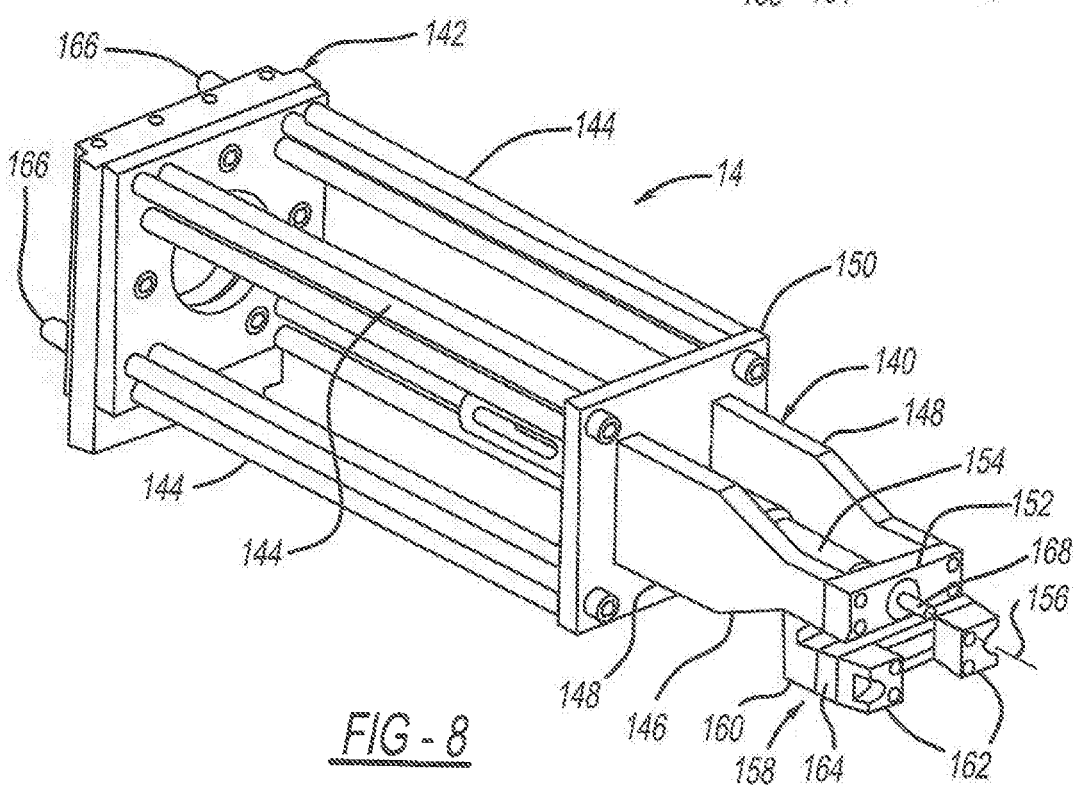
FIG. 8 is a perspective view of the configuration tool usable as part of the robotic system of FIG. 1, with the gripper finger depicted in an engaged state.

With specific reference to FIG. 7 and FIG. 8, the configuration tool 14 includes an axially-extending tool assembly 140 and the tool changer 142 coupled to the tool assembly 140 via axially-extending support rails 144. The tool assembly 140 includes a tool body 146, which may include parallel plates 148 each shaped as a rectangle or another polygon. Each parallel plate 148 is mounted to (and extends from) a first end plate 150 toward a second end plate 152. The first and second end plates 150, 152 are part of the tool body 146 and may be rectangular in shape. The first end plate 150 may be larger in area than the second end plate 152 to facilitate use in configuring the end-effector assembly 16.

A nutrunner 154 can rotate about a nutrunner axis 156 (i.e., bit axis) and extends through the second end plate 152 and is used to adjust the swing arm lock 70 and the swing branch lock 74. In the present disclosure, the term "nutrunner" means a powered torque wrench capable of using pneumatic, electric, or hydraulic power to rotate and transmit torque. The nutrunner 154 may be driven with a servo motor and control for precise and consistent rotation.

In addition, the tool assembly 140 includes a gripper 158 coupled to the tool body 146 at a location closer to the second end plate 152 than to the first end plate 150. The gripper 158 is parallel to the nutrunner 154 and includes a gripper actuator 160 and a plurality of gripper fingers 162 movably coupled to the gripper actuator 160. The gripper actuator 160 can be an electric or pneumatic actuator, and the tool changer 142 can channel electricity or pneumatic fluid for controlling the gripper 158 when the configuration tool 14 is mounted to the wrist 42. In the depicted embodiment, the gripper 158 includes two fingers 162. However, the gripper 158 may include more than two fingers 162.

Irrespective of the quantity, the gripper fingers 162 can move relative to one another between a first or disengaged position (FIG. 7) and a second or engaged position (FIG. 8). When disposed in the first position (FIG. 7), the gripper fingers 162 are closer to each other than in the second position (FIG. 8). The gripper fingers 162 may be coupled to the gripper actuator 160 via a sliding member 164. The sliding member 164 is coupled to the gripper fingers 162 and can be actuated by the gripper actuator 160 in order to move the gripper fingers 162 between the first and second positions.

The gripper fingers 162 of the gripper 158 are configured to grasp the tabs 97 of the swing branch lock 74 in order to hold the swing branch lock 74, thereby allowing the configuration tool 14 to move (translate or rotate) the tool branch 52 relative to the frame rail 48. In particular, to release the swing branch lock 74, the configuration tool 14 is robotically commanded to grasp the swing plate 107 on the tabs 97, then the nutrunner 154 turns the locking fastener 96 counter-clockwise to push the pivot shaft 103, and thus the branch rail 54. In turn, this allows the robot 12 to slide and rotate the tool branches 52 around the frame rail 48, as well as to swing the branch rail 54 about the axis of the pivot shaft 103 in combination for moving the end tools 66 to the desired position. Similarly, to lock the swing branch lock 74 upon reaching a desired position, and while the configuration tool 14 is still engaged, the nutrunner 154 turns the locking fastener 96 clockwise to pull in the pivot shaft 103 and the branch rail 54 to thereby lock the branch rail 54 in a desired configuration. In turn, the split flanges 84, 86 of the wrap-around clamp 82 are pinched over the frame rail 48, thereby securely locking the end-effector assembly 16 into position. As these steps can be performed concurrently, cycle time for reconfiguration can be reduced.

Similarly, the gripper fingers 162 of the gripper 158 can grasp the tabs 136 of the swing arm lock 70 in order to hold the swing plate 108, thereby allowing the configuration tool 14 to move (e.g., rotate or translate) the tool module 56 relative to the branch rail 54. In particular, to release the swing arm lock 70, the configuration tool 14 is robotically commanded to grasp the swing plate 108 on the tabs 136, then the nutrunner 154 turns the locking fastener 112 counter-clockwise to push the pivot shaft 104, and thus the swing arm 68. In turn, this allows the robot 12 to slide and rotate the tool module 56 around the branch rail 54, as well as to swing and tilt the swing arm 68 about the axis of the pivot shaft 104 and the tertiary axis 94, respectively in combination for moving the end tools 66 to the desired position. Similarly, to lock the swing arm 68 upon reaching a desired position, and while the configuration tool 14 is still engaged, the nutrunner 154 turns the locking fastener 112 clockwise to pull in the pivot shaft 104 and the swing arm 68 together to thereby lock the swing arm 68 in a desired configuration. In turn, this pinches the split flanges 114, 116 of the wrap-around clamp 106 over the roll shaft 87 including the upper and lower proximal split ends 103, 105 of the roll clamp (or wrap-around clamp) 90 and, in turn, over the branch rail 54, thereby securely locking the end-effector assembly 16 into position. As these steps can be performed concurrently, cycle time for reconfiguration can be reduced.

The tool changer 142 of the configuration tool 14 may be any suitable mechanical coupling, similarly to the tool changer 62 on the master boom 44, allowing the robot 12 to pick up the configuration tool 14 and includes guide pins 166 or other suitable coupling devices which enable the robot 12 to engage the configuration tool 14 with the wrist 42. The tool changer 142 may also include electrical and pneumatic ports capable of channeling electric and pneumatic power and control signals to run the nutrunner 154 via a drive motor inside the nutrunner 154. Once coupled to the wrist 42, the configuration tool 14 locks into place and electrical and/or pneumatic power is provided to the nutrunner 154 as needed to rotate the driver bit 168, e.g., a hex-head bit. Thus, actuating the nutrunner 154 causes the driver bit 168 to turn. At least part of the nutrunner 154 extends through the second end plate 152 in a direction away from the first end plate 150, such that the driver bit 168 is outside the tool body 146 and extends beyond the second end plate 152.

Figure 10:
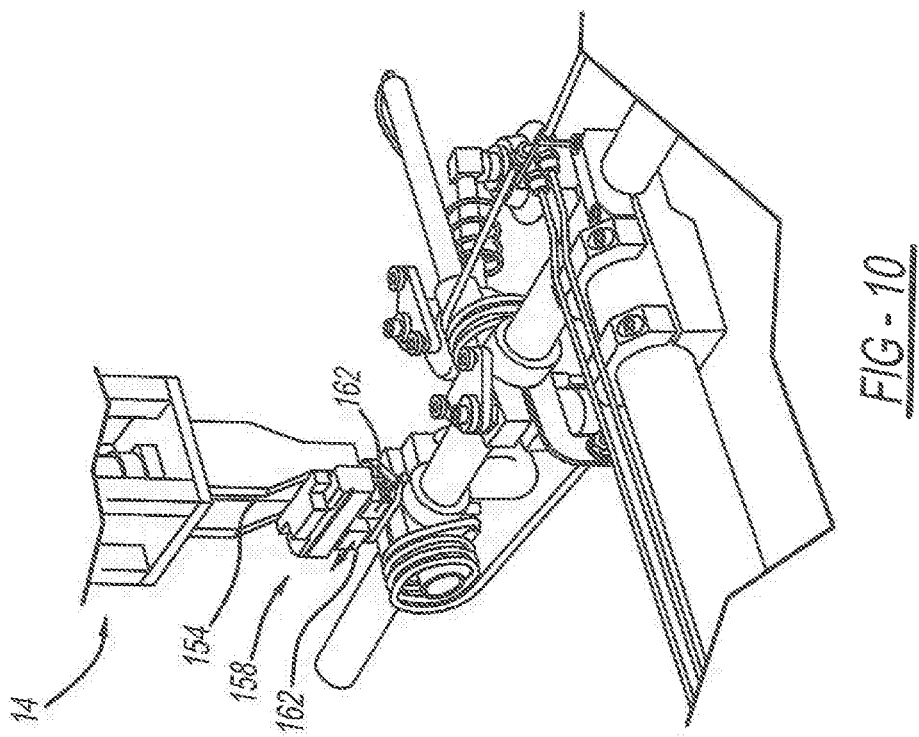
FIG. 10 is a perspective view of the configuration tool coupled to the swing branch lock of the end-effector assembly.
Figure 9:
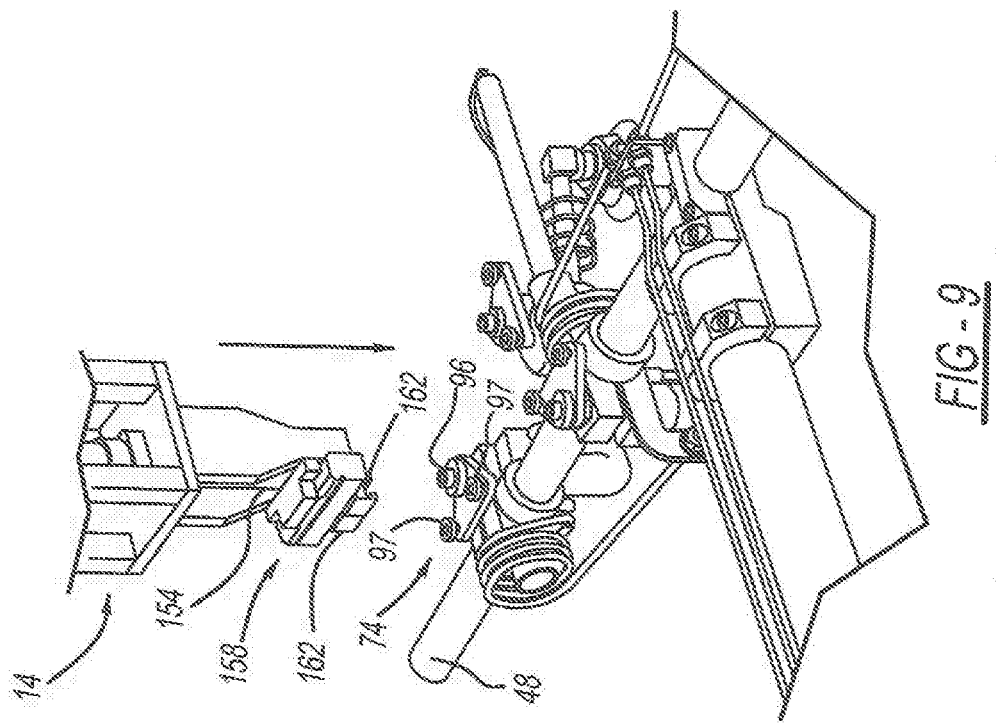
FIG. 9 is a perspective view of the configuration tool moving toward a swing branch lock of the end-effector assembly.

Referring to FIG. 9 and FIG. 10, in order to reconfigure the tool branch 52, the configuration tool 14 is manipulated first to engage the nutrunner 154 and its driver bit 168 with the fastener 96 of the swing branch lock 74 that wraps around on the frame rail 48, while the gripper fingers 162 on the configuration tool 14 remain in the first position (i.e., disengaged state) but in a position that is ready to engage with at least one of the tabs 97. Specifically, the robot 12 moves the configuration tool 14 toward the swing branch lock 74 such that the driver bit 168 is aligned with the fastener 96 and the gripper fingers 162 of the gripper 158 are aligned with at least one of the tabs 97, while the gripper fingers 162 are in the first position (i.e., disengaged state). The configuration tool 14 may be moved toward the swing branch lock 74 until the driver bit 168 is aligned with the fastener 96 and the gripper fingers 162 are aligned with at least one of the tabs 97. Then, as best shown in FIG. 10, the gripper fingers 162 are then moved to the second position (i.e., engaged state) in order to grasp at least one of the tabs 97. As discussed above, the gripper fingers 162 can be actuated pneumatically or electrically.

Next, the controller 18 electrically commands the nutrunner 154 to engage the driver bit 168 with the fastener 96. The driver bit 168 may rotate (e.g., counter-clockwise) to loosen the fastener 96 and release the swing branch lock 74 from secure engagement on the frame rail 48. With the gripper fingers 162 of the configuration tool 14 grasping tightly on the at least one of the tabs 97, the robot 12 can slide and rotate the branch rail 54 along the frame rail 48, as well as, swing the branch rail 54 around the axis of the pivot shaft 103 to the desired position or orientation. Afterwards, the nutrunner 154 of the configuration tool 14 is commanded (by the controller 18) to rotate (e.g., clockwise) to tighten the fastener 96 to secure the swing branch lock 74 in the desired position on the frame rail 48. The controller 18 can also command the gripper fingers 162 to disengage (i.e., move to the first position) in order to release the at least one of the tabs 97 and disengage the configuration tool 14 from the swing branch lock 74 to complete the reconfiguration operation.

Figure 12:
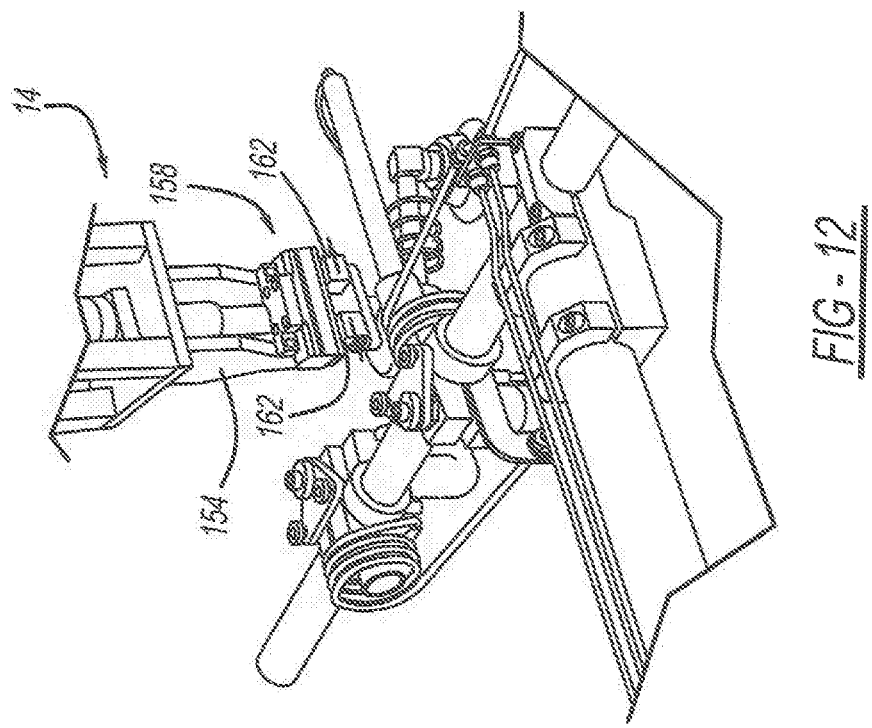
FIG. 12 is a perspective view of the configuration tool coupled to the swing arm lock of the end-effector assembly.
Figure 11:
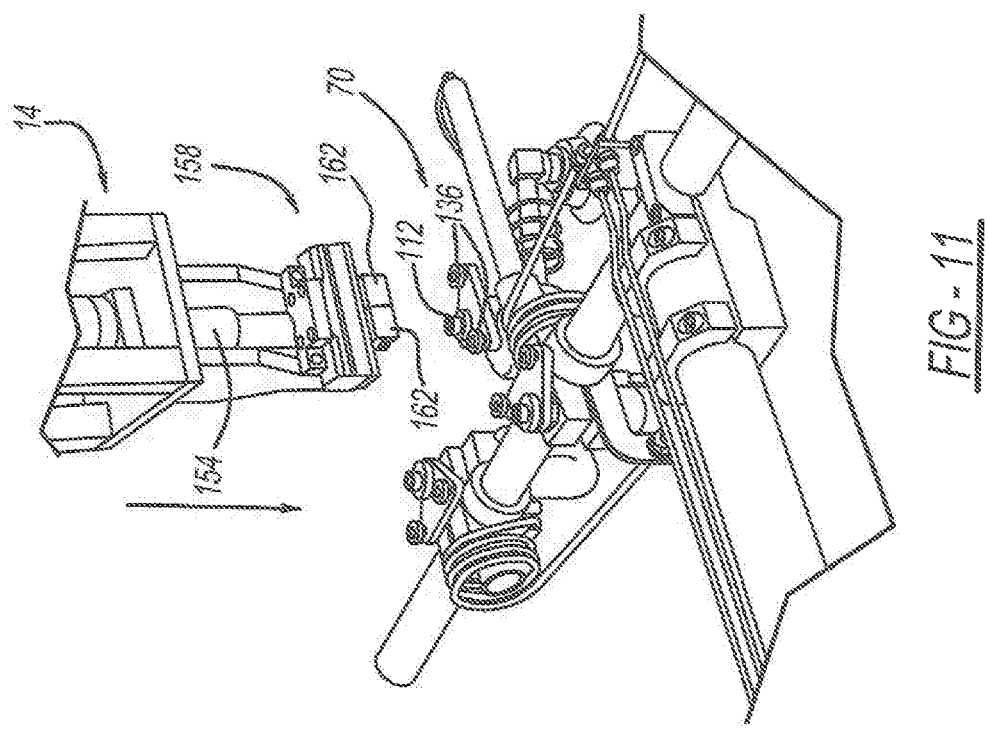
FIG. 11 is a perspective view of the configuration tool moving toward a swing arm lock of the end-effector assembly.

With reference now to FIG. 11 and FIG. 12, in order to configure the swing arm 68 or adjust the position and/or orientation of the end tool 66 (e.g., vacuum gripper), the configuration tool 14 may be manipulated to engage the nutrunner 154 and its driver bit 168 with the locking fastener 112 of the swing arm lock 70, while the gripper fingers 162 on the configuration tool 14 remain disengaged (i.e., in the first position) but in a position that is ready to engage with the locking fastener 112. Specifically, the robot 12 moves the configuration tool 14 toward the swing arm lock 70 such that the driver bit 168 is aligned with the locking fastener 112 and the gripper fingers 162 of the gripper 158 are aligned with at least one of the tabs 136, while the gripper fingers 162 are in the first position (i.e., disengaged state). The configuration tool 14 may be moved toward the swing arm lock 70 until the driver bit 168 is aligned with the head of the locking fastener 112 and the gripper fingers 162 are aligned with at least one of the tabs 136. Then, as best shown in FIG. 12, the gripper fingers 162 are engaged (i.e., moved to the second position) in order to grasp at least one of the tabs 136. As discussed above, the gripper fingers 162 can be actuated pneumatically or electrically.

Next, the controller 18 electrically commands the nutrunner 154 to engage the driver bit 168 with the locking fastener 112. The driver bit 168 may rotate (e.g., counter-clockwise) to loosen or push the locking fastener 112 from the pivot shaft 108. This action, in turn, releases the swing arm lock 70 from secure engagement on the branch rail 54, while concurrently allowing the swing arm 68 to move with respect to the swing arm lock 70. With the gripper fingers 162 of the configuration tool 14 grasping tightly on the at least one of the tabs 136, the robot 12 can slide and rotate the swing arm 68 along the branch rail 54, as well as, tilt the swing arm 68 around the roll shaft 87 including the upper and lower proximal split ends 103, 105 of the wrap-around clamp 90 to the desired position or orientation. Additionally, the robot 12 can also rotate the swing arm 68 and the end tool 66 (e.g., vacuum gripper) around the axis of the pivot shaft 104. Afterwards, the nutrunner 154 of the configuration tool 14 is commanded (via the controller 18) to rotate (e.g., clockwise) to tighten the locking fastener 112 to secure the swing arm lock 70 in the desired position on the branch rail 54, as well as, to secure the swing arm 68 in the proper orientation with respect to the swing arm lock 70. Then, the controller 18 can also command the gripper fingers 162 to disengage (i.e., move to the first position) to release the tabs 136 and disengage the configuration tool 14 from the swing arm lock 70 to complete the reconfiguration operation.

Figure 13:
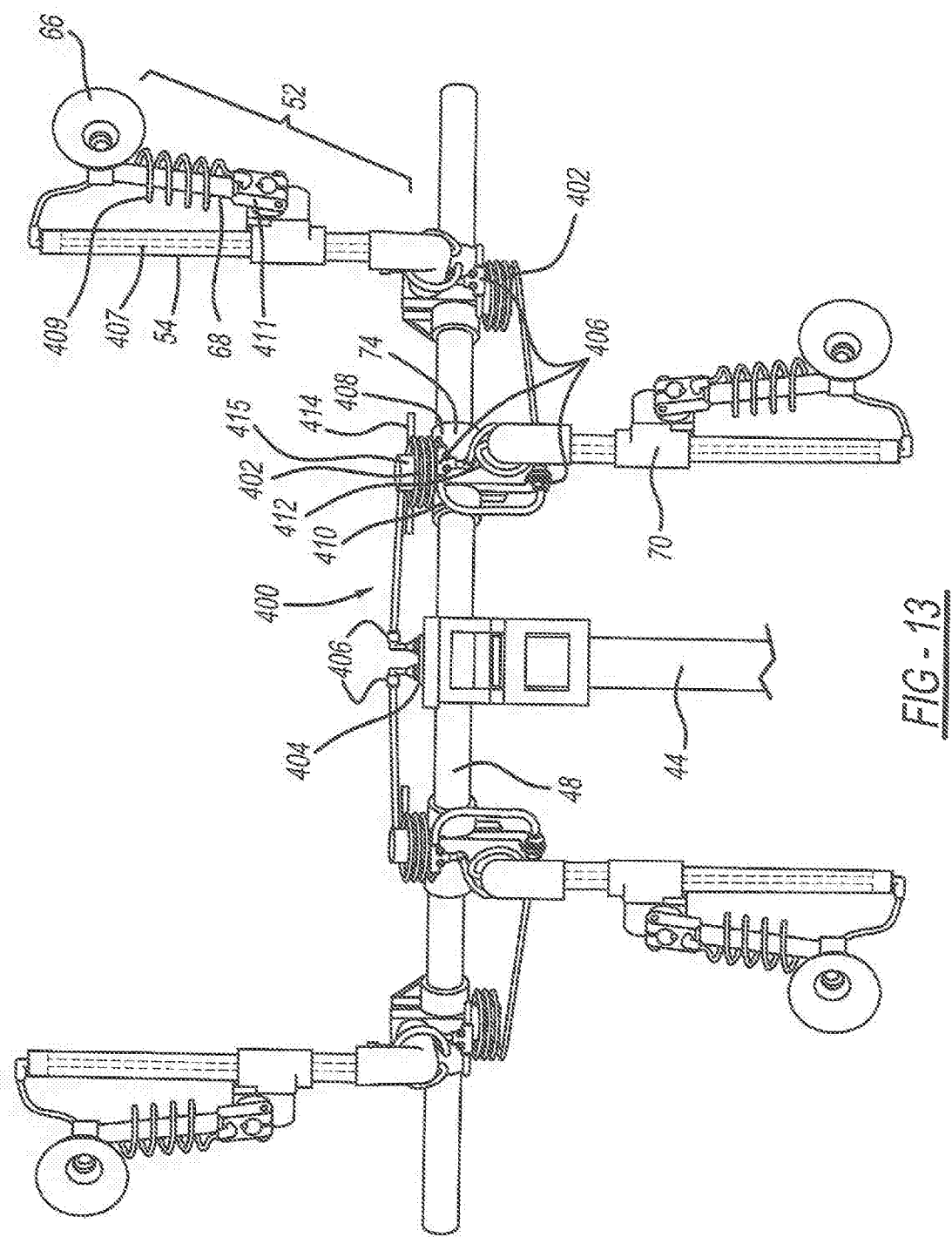
FIG. 13 is a perspective view of a flexible pneumatic dress assembly for use the end-effector assembly of FIG. 1.

With reference now to FIG. 2 and FIG. 13, the flexible pneumatic dress assembly 400 is disclosed for use with the end-effector assembly 16 for channeling gas (e.g., air) from the robot 12 and into or out of the end tools 66 (e.g., vacuum gripper). In particular, the pneumatic dress assembly 400 includes a plurality of coiled or helical pneumatic tubing 402 arranged at various positions along the plurality of tool branches 52, a main manifold 404 secured to the master boom 44, and a plurality of pneumatic fittings 406 arranged between the main manifold 404 and the tubing 402. In the example embodiment described above in which the end tools 66 are pneumatic grippers, various sized pneumatic tubing may be used to transmit pneumatic air or vacuum from the robot 12 through the tool changer assembly 60 and to the end tools 66 of the end-effector assembly 16. The routing of the coiled or helical tubing 402 takes advantage of the recoil capability of the tubing 402 such that the tubing 402 can stretch and collapse manner to its defined geometry and shape as the tool branches 52 are reconfigured.

The flexible pneumatic dress assembly 400 may be routed along the master boom 44 to establish the main manifold 404 between the master boom 44 and the frame rail 48. The main manifold 404 may further include a pair of the pneumatic fittings 406 extending in either direction along the frame rail 48. The remaining fittings 406 and tubing 402 are interconnected in a daisy-chain connection from the main manifold 404 to neighboring tool branches 52 and directed to the various end tools 66. In particular, each swing branch lock 74 incorporates its own helical tubing 402 arrangement therearound, as best shown in FIG. 13. Each helical tubing 402 may be coiled near the proximal end of the branch rail 54 for several turns. As the swing branch lock 74 is moved, the helical tubing 402 may exhibit a diameter difference between the coil inner diameter and the branch rail 54 outer diameter, thereby allowing the tubing 402 to be stretched or to recoil back. Each tubing 402 may have a single input 408 and dual outputs 410, 412. The single input 408 may be interconnected with the fittings 406 of the main manifold 404 or of a preceding swing branch lock 74. The first output 410 may interconnect with an additional swing branch lock 74 along the branch rail 54, if any. The second output 412 may be routed to the hollow inner of the branch rail 54 with a tubing 407. The tubing 407 may also interconnect with the end tool 66 via a smaller helical tubing 409 coiled around the swing arm 68 for several turns and terminated at a pneumatic fitting 411 on the swing arm 68 near the pivot shaft 104. The fitting 411 has an air passage connecting to the hollow inner 134 of the swing arm 68, which is employed directly as pneumatic conduit to the end tools 66.

The tubing 402 may be further constrained along the branch rail 54 through the addition of a retaining feature 414, such as a straight pin piercing through a rear protrusion 415 of the swing branch lock 74. The retaining feature 414 ensures that the tubing 402 remains outside of the position of any moving parts of the end-effector assembly 16 (i.e., tool module 56) or the configuration tool 14 during the reconfiguration operation. In one example, the retaining feature 414 can be an L-shaped hook extending from at least one side of the branch rail 54. In another example, the retaining feature 414 can be a straight pin piercing through the branch rail 54 near the swing branch lock 74, as shown.

Figure 14:
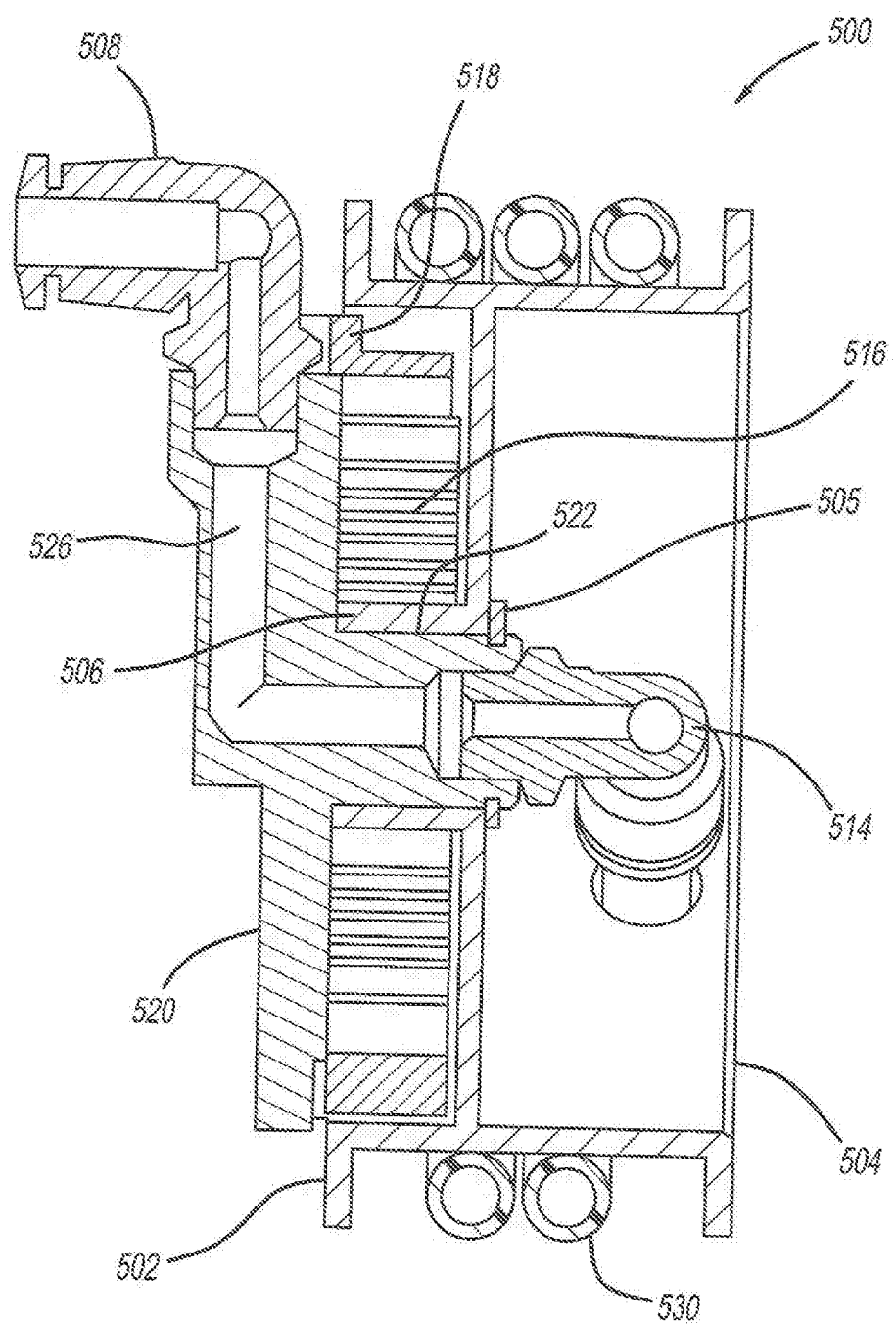
FIG. 14 is a cross-section view of a spring-loaded tubing reel, an alternative to the helical tubing of FIG. 13.

Referring to FIG. 14, another exemplary flexible pneumatic dress assembly 500 incorporates a spring-loaded tubing reel 502 in lieu of the simple helical tubing 402. The tubing reel 502 can, advantageously, stretch and/or collapse tubing in an actively defined geometry and shape rather than relying passively on the recoil capability of the tubing material.

The spring-loaded tubing reel 502 consists of a drum 504 having a hub 506. The reel 502 is coupled to a shaft 522 of a reel support 520. The drum 504 and the reel support 520 are assembled and held together with a retaining ring 505. A spiral-shaped power spring 516 is installed between the drum 504 and the reel support 520. The inner end of the power spring 516 is fixedly secured to the hub 506 of the drum 504, while the outer end of the power spring 516 is secured to a spring cover 518. The spring cover 518 is, in turn, fastened to the reel support 520 with a fastener (e.g., screw, bolt) after the installation of the power spring 516.

While the reel support 520 is secured to the rear protrusion 415 of the swing branch lock 74 via an adapter plate (not shown) with plurality of fasteners (e.g. bolts, screws), the drum 504 is free to rotate with the winding of power spring 516. The reel support 520 also has a hollow core 526 functioning as a pneumatic conduit having a first end connected to a pneumatic fitting 508 and a second, opposing end connected to another pneumatic fitting 514. The second fitting 514 accepts tubing 530 coiled on the drum 504. The fitting 514 may swivel freely to accommodate the rotation of the drum 504 resulting from stretching or collapsing of the tubing 530 during the robotic movement of the swing branch locks 74 for end-effector reconfiguration. The power spring 516 assists in maintaining the tubing 530 in tension, and due to the tension, retaining features may not be required.

Embodiments of the present disclosure are described herein. This description is merely exemplary in nature and, thus, variations that do not depart from the gist of the disclosure are intended to be within the scope of the disclosure. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for various applications. Various combinations and modifications of the features consistent with the teachings of this disclosure, however, could be desired for particular applications or implementations.

What is claimed is:

1. An end-effector assembly comprising:
    a master boom having a flexible dress assembly secured thereto;
    a frame rail coupled to the master boom, the flexible dress assembly having a portion of hosing extending along at least a portion of the frame rail;
    at least one branch rail movably coupled to the frame rail by a swing branch lock, the swing branch lock having an extension leg for receiving a coiled portion of the flexible dress assembly; and
    a swing arm movably coupled to the at least one branch rail by a swing arm lock, the swing arm lock including at least one fitting for receiving a first end of the flexible dress assembly secured thereto, wherein the swing arm lock further comprises:
        a clamp assembly configured to movably secure the swing arm to the branch rail, the clamp assembly comprising:
            a roll clamp movably secured to the branch rail, the roll clamp comprising a body and a shaft, the body having a first end extending to a second end, the body having an opening formed through the first and second ends to define an outer wall movably disposed about the branch rail, the shaft having a proximal end extending to a closed distal end, the proximal end disposed on the outer wall and extending therefrom, the body having a slot formed through the outer wall from the first and second ends and through the proximal end of the shaft defining first and second split portions of the shaft, the distal end being closed; and
            a pitch-yaw clamp movably secured about the shaft and configured to lock and unlock the roll clamp to the branch rail;
        a pivot shaft extending through the clamp assembly and configured to rotationally secure the clamp assembly in place;
        a swing plate secured to the pivot shaft and configured for engagement with a configuration tool; and
        a locking fastener extending through the swing plate and into the pivot shaft, wherein the locking fastener is configured to lock and unlock the pitch-yaw clamp about the shaft, thereby locking and unlocking the roll clamp to the branch rail.

2. The end-effector assembly of claim 1 wherein the swing arm lock is movable along the branch rail between an unlocked and a locked state so as to fix the swing arm in position relative to the branch rail.

3. The end-effector assembly of claim 1 wherein the first end of the roll clamp comprises a first bearing bushing and a first bushing collet attached thereto, the first end having a collar retainer attached to the first bushing collet and wherein the second end comprises a second bearing bushing and second bushing collet attached thereto, the second end having an endcap retainer attached to the second bushing collet.

4. The end-effector assembly of claim 1 wherein the slot on the shaft is formed from the proximal end to a length along the shaft.

5. The end-effector assembly of claim 1 wherein the slot on the shaft is formed from the proximal end a length adjacent the shaft.

6. An end-effector assembly comprising:
    a master boom having a flexible dress assembly secured thereto;
    a frame rail coupled to the master boom, the flexible dress assembly having a portion of hosing extending along at least a portion of the frame rail;
    at least one branch rail movably coupled to the frame rail by a swing branch lock, the swing branch lock having an extension leg for receiving a coiled portion of the flexible dress assembly; and
    a swing arm movably coupled to the at least one branch rail by a swing arm lock, the swing arm lock including at least one fitting for receiving a proximal end of the flexible dress assembly secured thereto,
    wherein the swing branch lock further includes:
        a first clamp assembly configured to movably secure the branch rail to the frame rail;
        a first pivot shaft extending through the first clamp assembly and configured to rotationally secure the first clamp assembly in place;
        a first swing plate secured to the first pivot shaft and configured for engagement with a configuration tool; and
        a first locking fastener extending through the first swing plate and into the first pivot shaft, wherein the first locking fastener is configured to lock and unlock the first clamp assembly in position,
    wherein the swing arm lock further includes:
        a second clamp assembly configured to movably secure the swing arm to the branch rail, the second clamp assembly comprising:
            a roll clamp movably secured to the branch rail, the roll clamp comprising a body and a shaft, the body having a first end extending to a second end, the body having an opening formed through the first and second ends to define an outer wall movably disposed about the branch rail, the shaft having a proximal end extending to a closed distal end, the proximal end disposed on the outer wall and extending therefrom, the body having a slot formed through the outer wall from the first and second ends and through the proximal end of the shaft defining first and second split portions of the shaft, the distal end being closed; and
            a pitch-yaw clamp movably secured about the shaft and configured to lock and unlock the roll clamp to the branch rail;
        a second pivot shaft extending through the second clamp assembly and configured to rotationally secure the second clamp assembly in place;
        a second swing plate secured to the second pivot shaft and configured for engagement with a configuration tool; and
        a second locking fastener extending through the second swing plate and into the second pivot shaft, wherein second the locking fastener is configured to lock and unlock the pitch-yaw clamp about the shaft, thereby locking and unlocking the roll clamp to the branch rail, wherein unlocking the second clamp assembly of the swing arm allows the swing arm lock to be movable in at least a primary direction, a secondary direction, and a tertiary direction.

7. The end-effector assembly of claim 6 wherein the swing arm lock is movable along the branch rail between an unlocked and a locked state so as to fix the swing arm in position relative to the branch rail.

8. The end-effector assembly of claim 6 wherein the first end of the roll clamp comprises a first bearing bushing and a first bushing collet attached thereto, the first end having a collar retainer attached to the first bushing collet and wherein the second end comprises a second bearing bushing and second bushing collet attached thereto, the second end having an endcap retainer attached to the second bushing collet.

9. The end-effector assembly of claim 6 wherein the slot on the shaft is formed from the proximal end to a length along the shaft.

10. The end-effector assembly of claim 6 wherein the slot on the shaft is formed from the proximal end a length adjacent the shaft.

11. The end-effector assembly of claim 6 further comprising an end tool arranged at a distal end of the swing arm, the end tool defining a first side of the end-effector assembly for engagement with a workpiece, wherein the swing branch lock and the swing arm lock are configured to be engaged by the configuration tool on a second side of the end-effector assembly opposite to the first side.

\* \* \* \* \*